United States Patent [19]

Tucholski

[11] Patent Number: 4,457,990
[45] Date of Patent: Jul. 3, 1984

[54] THIN MINIATURE CELL CONSTRUCTION WITH RESHAPED GASKET

[75] Inventor: Gary R. Tucholski, Parma Heights, Ohio

[73] Assignee: Union Carbide Corporation, Danbury, Conn.

[21] Appl. No.: 359,775

[22] Filed: Mar. 19, 1982

[51] Int. Cl.³ .................... H01M 2/18; H01M 6/12
[52] U.S. Cl. .................................. 429/162; 429/174; 429/185
[58] Field of Search .............. 429/162, 185, 171–174, 429/133

[56] References Cited

U.S. PATENT DOCUMENTS

| 3,480,481 | 11/1969 | Gauthier et al. | 429/174 X |
| 4,121,021 | 10/1978 | Ogawa et al. | 429/162 |
| 4,209,574 | 6/1980 | Ruetschi | 429/162 X |
| 4,220,694 | 9/1980 | Uetani et al. | 429/172 |
| 4,224,387 | 9/1980 | Nakayama | 429/174 X |

FOREIGN PATENT DOCUMENTS

| 52-100134 | 8/1977 | Japan . |
| 53-59830 | 5/1978 | Japan . |
| 54-9736 | 1/1979 | Japan . |
| 54-115733 | 9/1979 | Japan . |
| 54-115734 | 9/1979 | Japan . |
| 55-150545 | 11/1980 | Japan . |
| 55-150546 | 11/1980 | Japan . |
| 55-150547 | 11/1980 | Japan . |
| 55-150548 | 11/1980 | Japan . |
| 55-150549 | 11/1980 | Japan . |
| 55-150550 | 11/1980 | Japan . |
| 55-150551 | 11/1980 | Japan . |

Primary Examiner—Anthony Skapars
Attorney, Agent, or Firm—William E. Dickheiser

[57] ABSTRACT

An improved sealing gasket for an electrochemical cell having an outer upstanding flange adapted for being compressed between the upper sidewall of the container and the peripheral edge of the cover to seal the cell, and an inner upstanding flange adapted to be turned over the peripheral edge of the separator so as to effectively secure and isolate the cathode disposed under the separator from the anode and the cover of the cell.

4 Claims, 5 Drawing Figures

THIN MINIATURE CELL CONSTRUCTION WITH RESHAPED GASKET

DESCRIPTION

TECHNICAL FIELD

This invention relates to an improved sealing gasket for sealing a cover to a container of an electrochemical cell, said gasket comprising a horizontal base with an outer upstanding flange compressed between the sidewall of the container and the peripheral edge of the cover and an inner upstanding flange whose inner wall defines a chamber which is adapted to contain the cell's cathode along with a separator thereon and wherein the upper portion of the inner flange is turned over the peripheral edge of the separator thereby effectively securing and isolating the cathode from the anode and the cover of a thin miniature cell.

BACKGROUND ART

The miniaturization of electronic devices has created a demand for very small but powerful electrochemical cells. Cells that utilize an alkaline electrolyte are known to provide high energy density per unit volume, and so are well suited for applications in miniature electronic devices such as hearing aids, watches and calculators. However, alkaline electrolytes, such as aqueous potassium hydroxide and sodium hydroxide solutions, have an affinity for wetting metal surfaces and are known to creep through the sealed metal interface of an electrochemical cell. Leakage in this manner can deplete the electrolyte solution from the cell and can also cause a corrosive deposit on the surface of the cell that detracts from the cell's appearance and marketability. These corrosive salts may also damage the device in which the cell is housed. Typical cell systems where this problem is encountered include silver oxide-zinc cells, nickel-cadmium cells, air depolarized cells, and alkaline manganese dioxide cells.

In the prior art it has been a conventional practice to incorporate insulating gaskets between the cell container and cover so as to provide a seal for the cell. Generally, the gasket must be made of a material inert to the electrolyte contained in the cell and the cell environment. In addition, it had to be flexible and resistant to cold flow under pressure of the seal and maintain these characteristics so as to insure a proper seal during long periods of storage. Materials such as nylon, polypropylene, ethylene-tetrafluoroethylene copolymer and high density polyethylene have been found to be suitable as gasket materials for most applications.

In conventional thin miniature cell constructions, a separator is disposed over the cathode to isolate and protect the cathode from contacting the anode and the cover terminal of the cell. If the edge of the cathode cuts the separator as can easily happen in thin miniature cells of about 0.060 inch height or less, the exposed edge of the cathode may contact the cover terminal of the cell thereby causing an internal short. Alternatively, in miniature silver oxide cells, silver migration may occur around the separator and thus also cause internal shorting. As stated above, this problem of internal shorting is particularly troublesome in a thin miniature cell of about 0.060 inch height or less since the upper edge of the cell container has to be turned over onto the gasket a sufficient amount to effectively seal the cell while also insuring that there will be sufficient terminal clearance for the cell. Terminal clearance, as used herein, refers to the distance that a cell cover extends above the peripheral sealing edge or shoulder (gasket and/or edge of the container), of the cell. Generally, a thin electrochemical cell fits snugly into a cavity in an electronic device in which it is to be used whereby the cell container contacts the positive lead of the device and the cell cover contacts the negative lead of the device. If the sealing gasket and/or edge of the container protrudes above the cell cover, then this protrusion may prevent the cell from properly contacting the negative lead of the device in which it is housed. If the cell cover is eclipsed by the container sidewall, then the sidewall may contact the negative lead of the electronic device, shorting out the circuit.

Many attempts have been made to refine the sealing gasket that is disposed between the cell container and cell cover of thin miniature cells. These approaches have primarily addressed the problem of electrolyte leakage and/or insufficient terminal clearance for proper electrical contact of thin miniature cells when positioned in a battery-powered device.

It is an object of the present invention to provide a means for adequately isolating and protecting the cathode of thin miniature cells from contacting the anode and cover terminal of the cell.

Another object of the present invention is to provide an improved means to effectively prevent internal shorting of the cell's cathode to the anode and cover terminal of thin miniature cells, such as silver oxide miniature cells.

Another object of the present invention is to provide a method for assembling thin miniature cells that is suited for automatic production while insuring the proper isolation of the cathode from the anode and cover terminal of the cell to effectively prevent internal shorting.

The foregoing and additional objects will become more fully apparent from the following description.

DISCLOSURE OF INVENTION

The invention relates to a galvanic cell comprising a container having a base, a sidewall and an open end and housing a cathode material in electrical contact with said cell container, an anode material, a separator between said anode and said cathode, an electrolyte in ionic contact with said cathode material and said anode material, a cell cover disposed over the open end of the container and in electrical contact with said anode material, and a sealing gasket compressed between said cover and said container; the improvement wherein said gasket comprises a horizontal base having an upstanding inner flange and an upstanding outer flange; said outer flange disposed adjacent to the inner sidewall of the container and compressed between the container sidewall and the edge of the cover thereby electronically insulating said cover from said container and sealing said cover to said container; said inner flange and the base of the container defining a chamber which contains the cathode and the separator on top of said cathode thereon and wherein the upper portion of the inner flange of the gasket is turned over and compressed on top of the outer edge of the separator thereby effectively isolating the cathode from making electronic contact with the cover. The upstanding outer flange of the gasket could be tapered to insure adequate terminal clearance as disclosed in applicant's copending application, Ser. No. 359,900.

The invention also relates to a method for assembling a galvanic cell comprising the steps:
(a) preparing a container having a base, an upstanding sidewall and an open end;
(b) placing a gasket comprising a horizontal base, an outer upstanding flange and an inner upstanding flange into the container such that the gasket base seats upon the container base, the outer upstanding flange of the gasket is disposed adjacent to the inner surface of the upstanding sidewall of the container, and the inner upstanding flange of the gasket along with the container base defines a chamber;
(c) placing a cathode and a separator into said chamber defined by the inner upstanding flange of the gasket such that the separator is disposed on top of the cathode;
(d) turning the upper portion of the inner upstanding flange of the gasket over the separator;
(e) disposing an electrolyte solution and anode on top of the separator and placing a cover on top of the open end of the container with the peripheral edge of the cover disposed at least partially within the flanges of the gasket; and
(f) sealing the cell by turning the top portion of the container sidewall over the outer upstanding flange of the gasket thereby compressing said outer flange between the container and cover so as to insure contact of the cover with the anode and to effectively seal said cover to, and electronically insulating said cover from, the container.

The preferred configuration of the gasket of this invention would have a somewhat U-shaped cross-section such that the outer upstanding flange could be used to seal the terminal cover to the container using conventional radial squeezing as generally disclosed in U.S. Pat. No. 3,069,489 or by some similar commercial crimping or curling technique to provide a barrier to electrolyte leakage. The inner upstanding flange along with the base of the container defines a chamber into which the cathode and separator can be placed. This arrangement is ideally suited for assembling the cathode and separator into the cell container on a continuous production run since it enables the half-cell assembly to be easily transported between stations without disturbing the alignment of the cathode and separator. The upper portion of the upstanding inner flange of the gasket is turned over and compressed against the peripheral edge of the separator using any conventional technique such as ultrasonics, hot forming, mechanical forming with or without heat, and the like. With the upper portion of the inner flange of the gasket turned over the separator, the cathode becomes completely isolated from the anode cover of the cell when the cover is assembled over the opening in the container thus effectively providing a barrier against material migration at the cathode-gasket interface. For example, in silver oxide cells, the gasket of this invention will also effectively prevent silver migration around the edges of the separator which could cause internal shorting of the cell. An added benefit of this invention is that the separator will be held in place during subsequent assembly operation, even after the adding of the electrolyte solution to the cell.

For most applications in thin miniature cell constructions having a height of about 0.060 inch or less, the upper portion of the inner flange of the gasket should be turned over the horizontal peripheral edge of the separator by at least about 0.010 inch and preferably about 0.025 inch.

The sealing gasket of this invention comprises a material selected with consideration given to its stability in the presence of the electrolyte, its resiliency, and its resistance to cold flow. Suitable polymeric materials are selected from the group consisting of nylon, polytetrafluoroethylene, fluorinated ethylene-propylene, ethylene copolymer with fluorinated ethylene-propylene, chlorotrifluoroethylene, perfluoro-alkyoxy polymer, polyvinyls, polyethylene, polypropylene, polystryene and the like. Other suitable materials would be recognizable by one skilled in the art. Additional precautions, well-known in the art, can be used in conjunction with the gasket of this invention to provide a more effective seal, such as coating the outer flange of the gasket surfaces with an adhesive agent such as a fatty polyamide resin.

The sealing gasket of this invention is amenable to production techniques such as injection molding. The configuration of the surfaces of the gasket flanges is well suited for ease of removal from dies, punches and the like.

The container for the cell could be made of stainless steel, iron, nickel, nickel-plated steel, or some other conductive material. The cover could be made of monel, copper clad stainless steel, or some other conductive material. However each should be made of a conductive material that will not corrode or otherwise deteriorate when in contact with cell materials.

BRIEF DESCRIPTION OF DRAWING

The invention will become apparent when considered together with the following drawing which is set forth as being merely illustrative of the invention and is not intended, in any manner, to be limitative thereof and wherein.

DETAILED DESCRIPTION OF DRAWING

Figure 1:
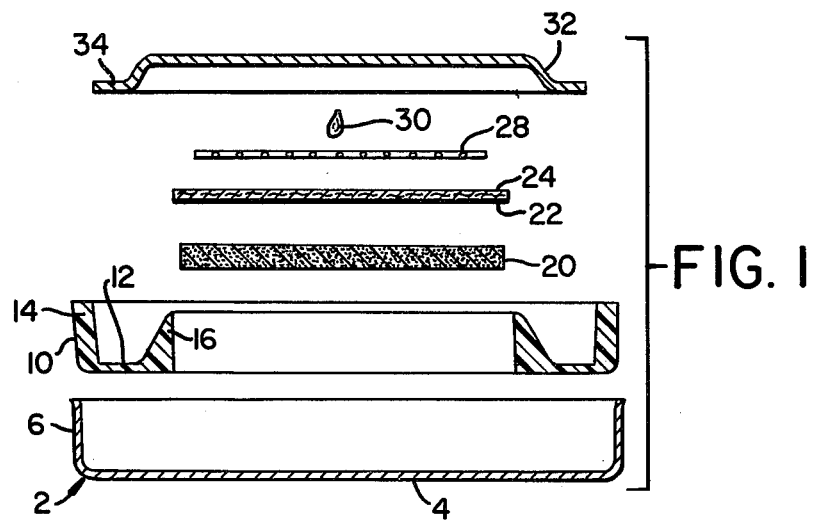
FIG. 1 is an exploded sectional elevational view of a cell employing the gasket of this invention.
Figure 2:
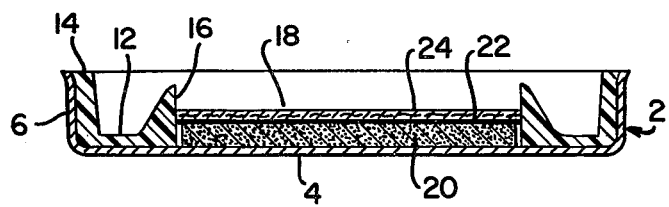
FIG. 2 is a sectional elevational view showing a gasket of this invention assembled in a cell container and wherein a cathode and separator are assembled within a chamber defined by the upstanding inner flange of the gasket and the base of the container.

Referring to FIG. 1, there is shown an exploded view of a cell comprising a container 2 having a horizontal base 4, an upstanding sidewall 6 and an open end 8. A gasket 10 is designed to seat within container 2 and comprises a horizontal base 12, an upstanding outer flange 14 and an upstanding inner flange 16. As shown in FIG. 2, the upstanding inner flange 16 and base 4 of container 2 defines a chamber 18 into which is placed cathode pellet 20, such as a silver oxide pellet, followed by a two-layer barrier separator 22 (comprising cross linked polyethylene and cellophane) and a soak-up separator 24 (made of paper).

Figure 3:
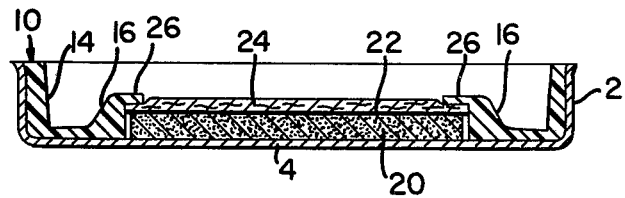
FIG. 3 is a sectional elevational view of the partially assembled cell of FIG. 2 wherein the inner flange of the gasket is bent over the separator.

As shown in FIG. 3, the upper portion 26 of upstanding inner flange 16 is formed over and compressed against the peripheral edge of separator 24 using a technique such as ultrasonic forming. This effectively isolates and protects cathode pellet 20 and secures the separator 22 and 24 and cathode pellet 20 in the container 2 so that the partially assembly cell can be transported between stations for additional assembling.

Figure 4:
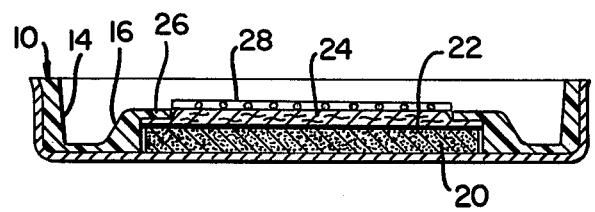
FIG. 4 is a sectional elevational view of the partially assembled cell of FIG. 3 wherein the anode is assembled over the separator.

As shown in FIGS. 1 and 4, an anode 28, such as a zinc screen, is placed on top of the separator 24. Prior to or after assembly of the anode 28 on the separator 24, the cell electrolyte solution 30 (see FIG. 1) is added into container 2 where it gets soaked-up by separator 24.

Figure 5:
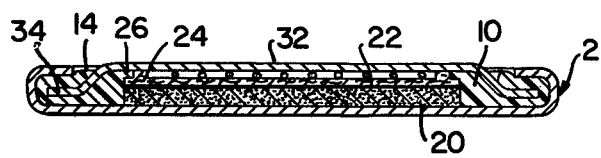
FIG. 5 is a sectional elevational view of the fully assembled cell of FIG. 1 showing the cover of the cell secured to the open end of the container.

As shown in FIGS. 1 and 5, the anode cover 32 is placed over the open end 8 of container 2 such that the peripheral edge 34 of cover 32 fits at least partially within flanges 14 and 16 of gasket 10. Thereafter, the top edge of the container 2 is radially squeezed into the gasket flange 14 and cover edge 34 in a conventional manner and then the top edge of the container is crimped over the gasket to effectively seal the cover 32 to the container 2 as shown in FIG. 5. As evident from FIG. 5, upper portion 26 of gasket 10 isolates cathode 20 from cover 32 to effectively prevent internal shorting of the cell. In silver oxide cell systems, the upper portion 26 of gasket 10 will provide a barrier against silver migration at the interface of cathode 20 and gasket 10 thereby preventing any silver from contacting the anode or cover of the cell which could result in internal shorting.

The sealing gasket of this invention (a) will effectively isolate the cathode so that its edge does not make contact with the anode or cell cover which would result in internal shorting of the cell; (b) provides a means for securing the cathode and separator in the cell container during assembly so that these components can be transported without losing alignment; and (c) in silver oxide thin miniature cells, will effectively prevent silver migration through the gasket-cathode interface to contact the anode or cover of the cell which could cause internal shorting.

EXAMPLE

Button cells were manufactured wherein each cell had an overall height of about 0.040 in. (0.102 cm) and utilized a sealing gasket of this invention as basically shown in FIGS. 1 through 5.

A sealing gasket having about an 0.460 inch (1.168 cm) outer diameter and about an 0.311 inch (0.790 cm) inner diameter was inserted into an about 0.472 inch (1.199 cm) outer diameter cell container which had an about 0.055 inch (0.140 cm) high sidewall and a base and sidewall thickness of about 0.006 inch (0.15 cm). The overall height of the outer flange of the gasket was about 0.032 inch (0.089 cm) while the inner flange of the gasket was about 0.035 inch (0.089 cm).

After inserting the gasket into the container, a cathode pellet of silver oxide, covered on top with a separator composed of crosslinked polyethylene, cellophane and paper, was placed in the central opening of the gasket. The upper portion of inner flange of the gasket was bent over and compressed against the peripheral edge of the separator thereby securing the cathode and separator in the container as shown in FIG. 3. Thereafter, the anode (zinc) and sodium hydroxide electrolyte was added and then a cell cover was seated over the anode whereupon its peripheral edge rested within the flanges of the gasket. The cell assembly was swaged and crimped during which the uppermost portion of the outer flange of the gasket and container sidewall were bent substantially parallel to the base of the cell container as shown in FIG. 5.

It is to be understood that modifications and changes to the preferred embodiment of the invention herein shown and described can be made without departing from the spirit and scope of the invention.

I claim:

1. In a galvanic cell comprising a container having a base, a sidewall and an open end housing a cathode material in electrical contact with said cell container, an anode material, a separator between said anode and said cathode, an electrolyte in ionic contact with said cathode material and said anode material, a cell cover disposed over the open end of the container and in electrical contact with said anode material, and a sealing gasket compressed between said cover and said container; the improvement wherein said sealing gasket comprises a horizontal base having an inner flange and an outer flange; said outer flange disposed adjacent to the inner sidewall of the container and compressed between the container sidewall and the edge of the cover thereby electronically insulating said cover from said container and sealing said cover to said container; said inner flange and the base of the container defining a chamber which contains the cathode and the separator thereon and wherein the upper portion of the inner flange of the gasket is turned inwardly and compressed on top of the outer edge of the separator to define a cavity between the separator and the cover such that the anode is entirely positioned in said cavity thereby effectively isolating the cathode from making electronic contact with the anode and cover of the cell.

2. In the galvanic cell of claim 1 wherein the upper portion of the outer flange of the gasket and the upper portion of the container sidewall are bent substantially parallel to the base of the container.

3. In the galvanic cell of claim 1 or 2 wherein said gasket is made from a polymeric material selected from the group consisting of nylon, polytetrafluoroethylene, fluorinated ethylenepropylene, ethylene copolymer with fluorinated ethylene-propylene, chlorotrifluoroethylene, perfluoro-alkyoxy polymer, polyvinyls, polyethylene, polypropylene and polystryene.

4. In the galvanic cell of claim 3 wherein the anode is zinc, and the cathode is silver oxide.

* * * * *